United States Patent [19]
Kennedy

[11] 4,228,509
[45] Oct. 14, 1980

[54] MULTIVARIABLE CONTROL SYSTEM FOR REGULATING PROCESS CONDITIONS AND PROCESS OPTIMIZING

[76] Inventor: James P. Kennedy, 700 Cary Dr., San Leandro, Calif. 94577

[21] Appl. No.: 785,617

[22] Filed: Apr. 7, 1977

[51] Int. Cl.$^2$ .................... G06F 15/46; G05B 13/02; C10G 39/00
[52] U.S. Cl. .................... 364/501; 208/133; 208/DIG. 1; 364/105; 364/108
[58] Field of Search ............ 364/105, 106, 500, 502, 364/496, 501, 108, 109, 118; 208/DIG. 1, 133, 134

[56] References Cited

U.S. PATENT DOCUMENTS

| | | | |
|---|---|---|---|
| 3,510,635 | 5/1970 | Rouxel et al. | 364/105 |
| 3,617,717 | 11/1971 | Smith | 364/106 |
| 3,725,653 | 4/1973 | Carr et al. | 364/106 |
| 3,759,820 | 9/1973 | Boyd | 364/105 X |
| 3,947,668 | 3/1976 | Al-Shaikh et al. | 364/106 |

OTHER PUBLICATIONS

Kennedy–"A Simple Multivariable Control Algorithm With Applications to Gasoline Blending and Ammonia Reform Furnaces", 1975, Summer Computer Simulation Conference Proceedings, AFIPS Press, Montvale, N.J.

Primary Examiner—Joseph F. Ruggiero
Attorney, Agent, or Firm—Theodore B. Roessel; Joseph C. MacKenzie

[57] ABSTRACT

A system for regulating and optimizing process conditions, such as octane number, aniline point or density of reformed hydrocarbons, by manipulating various process variables in order to control the process, both in accordance with a regulatory effect, namely, such as to cause the process to achieve and maintain the desired setpoint and setpoints for the process condition or conditions, and in accordance with an optimizing effect, namely, such as to cause the process to achieve some predetermined state defined as optimum. The effects are not necessarily consistent, but relative weights are assigned to the two effects such that the regulating effect is paramount until the process condition or conditions are substantially at setpoint or setpoints, at which time the regulating effect is minimum, thus allowing the optimizing effect to influence the process. In particular, furnace outlet temperatures are directly controlled, using set points which are a joint function of outlet temperatures, octane and skin temperatures. Skin temperatures are used to limit the process, and outlet temperatures are used in the optimization.

12 Claims, 2 Drawing Figures

MULTIVARIABLE CONTROL SYSTEM FOR REGULATING PROCESS CONDITIONS AND PROCESS OPTIMIZING

FIELD OF THE INVENTION

The field of the invention is process regulated and optimization by manipulating a plurality of process variables to achieve desired process conditions, particularly as applied to petrochemical applications, such as reforming.

THE PRIOR ART

As of the time of my invention, numerous applications of multivariable process condition regulation and process optimization were known, involving more or less automatic control systems operating on computer principles.

While my invention specifically relates to "more or less automatic control systems operating on computer principles", the hardware required to practice it is well known and may be either digital or analog. While the "computer principles" which underlie the invention are somewhat abstruse, the net result can be described quite simply in terms of process behavior under control according to my invention.

SUMMARY OF THE INVENTION

Briefly stated, a reformer constituted by a train of furnace-reactor pairs is started up with a given octane setpoint, and a set of outlet temperature setpoints consistent with the octane setpoint. As long as the reactors remain within operating limits, and the octane setpoint differs from actual octane of the reformed product, the outlet temperature setpoints are adjusted in such fashion as to regulate reactor heating such that actual octane number is being maintained at or caused to move toward, the octane setpoint. At the same time, outlet temperature setpoints are also being adjusted on an optimizing basis. However, if the actual octane number is being maintained at setpoint, the optimizing adjustments alone affect outlet temperature setpoints, until or unless actual octane number departs from the setpoint. According to my invention, the optimizing outlet temperature setpoint adjustments are small enough with respect to adjustments thereof which result from octane deviation from octane setpoint, that the former adjustments have negligible affect when the latter adjustments are occurring.

In practice, the foregoing has also to account for furnace tube skin temperatures. According to my invention, this is done by decreasing the outlet temperature setpoint of any furnace in which the skin temperature limit is exceeded while concurrently allowing the octane deviation, if any, and optimization, to affect outlet temperature setpoints of all furnaces, regardless of limiting skin temperature.

DESCRIPTION OF THE PREFERRED EMBODIMENTS

Figure 1:
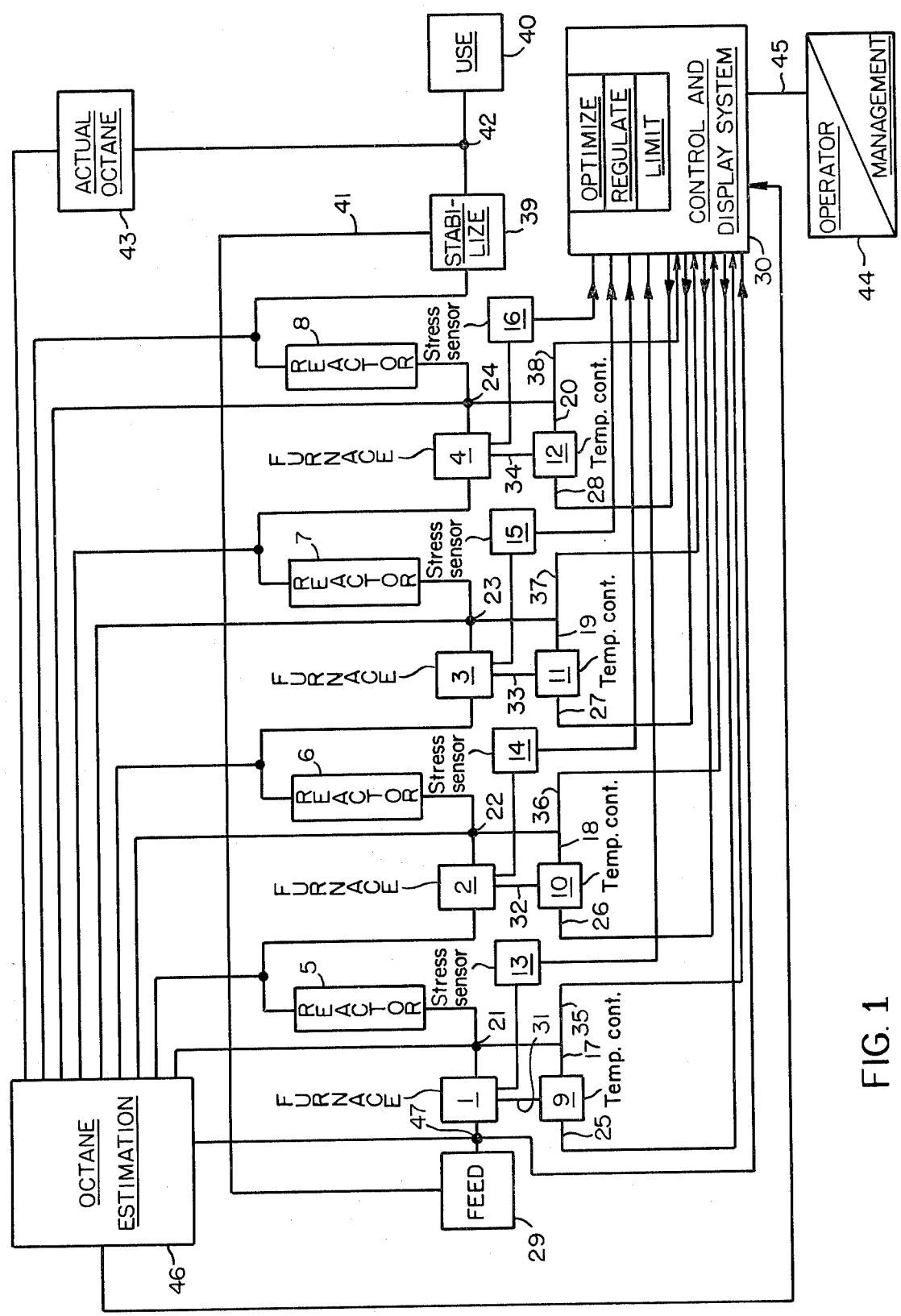
FIG. 1 shows schematically the application of my invention to a system for producing gasoline blending stock by reforming.

In FIG. 1, furnaces 1 through 4 and reactors 5 through 8 are paired, the reactors being connected in series, outlet to inlet, via furnaces 2, 3 and 4. On the way to the reactors, the feed stock to be reacted passes through the furnaces, which heat the stock under control of temperature controllers 9 through 12.

The operation of the furnaces has to be limited by the amount of tube skin stress which the reactors can stand. Though skin stress is usually assessed by measuring furnace tube skin temperature, for convenience, I have chosen to represent such expedients merely by boxes 13 through 16 which are to be understood as sensing some property of the furnaces from which some measure of the stress therein may be inferred.

Controllers 9 through 12 have "actual value" input connections 17 through 20 to which outlet temperature sensing devices (not shown), but located at points 21 through 24 in the outlets of furnaces 1 through 4) send signals which are measures of the respective furnace outlet temperatures, or rather, of the temperature of the fluid flowing out of the furnaces. There is also a feed flow sensing device and controller (not shown) but located at point 47 in the feed line to the unit.

Controllers 9 through 12 also have "setpoint" input connections 25 through 28, via which setpoint signals or commands from a control and display system 30 determine the desired values for the temperatures at 21 through 24.

Controllers 9 through 12 also have output connections 31 through 34 by means of which the controllers apply control effects or commands to the furnaces 1 through 4, such as to cause their influences on the temperature at 21 through 29 to change in such fashion as to minimize the differences between the outlet temperature setpoint values, and the actual values sensed at 21 through 24. Connections 35 through 38 provide for transmitting outlet temperature signals to system 30, for display there and use in computation.

A source of feedstock 29 feeds fluid hydrocarbons to furnace 1, and eventually fluid hydrocarbons flow out of reactor 8 into compression, gas-liquid separation, and stabilizing equipment 39, from which the end product flows to some end use or store 40. On the way to equipment 39, the feedstock underwent the usual hydrogen-evolving and octane-increasing reactions catalyzed by one or another variety of catalytic material (not shown) with which the reactors are charged. Much of the hydrogen which evolves is recombined in high-octane components of the process fluid, as the feedstock moves through the reactors but at the end there is an excess of non-condensible vapors remaining before stabilizing the output of reactor 8, which excess at least partly is recycled through connection 41 back to source 29, since upstream the reforming process is a net producer of hydrogen in general.

The stabilized end product from equipment 39 is sensed or sampled at point 42 in order to get a measure of its octane number O, which is the ultimate process condition which is being controlled. While octane number is a concept which does not lend itself to continuous on-line measurement in the same sense as does temperature, and the like, for my purpose, it does not matter, so for clarity, I will proceed for now as if it is measured continuously and on-line by suitable measuring apparatus shown generally as box 43.

As described so far, the process can be controlled through an operator (and/or plant management), as represented by box 44 having connection 45 to system 30, which connection symbolizes the interchange of information between operator and process via system 30 which not only displays process variables (skin temperatures, reactor outlet temperatures, header pressure, feedstock flow and other information customarily associated with reforming systems), but also allows the operator direct and indirect control of the process variables, and, in general, almost plenary supervisory power over all aspects of the process.

More particularly, the process generally is started up by the operator who knows, or has been informed of some set of parameters, particularly rate of feed of feedstock, skin temperature limits, furnace outlet temperature setpoints, and octane number setpoint.

Using such information, the operator, via system 30 can achieve an operating state where, in effect, he keeps the reactor outlet temperatures at setpoints which make octane number keep the octane setpoint, while watching that skin temperatures stay within allowable limits.

Such control of the process is pure empiricism and as such is only optimal by chance, and is inevitably idiosyncratic and arbitrary, in some degree.

My invention, in effect, at this point takes over from the operator, on the one hand, controlling the furnaces such as to regulate the process more effectively, in respect of maintaining the octane setpoint, and preventing excessive furnace stress, while on the other hand, concurrently acting to optimize a selected objective function as well.

In the present invention, octane is represented by a function of the outlet temperatures and feedstock rate, the form of which function is such that partial derivatives thereof relate octane change to change in catalyst average temperature. This is merely by way of example, and the only restriction on the form of the function is that it and its first derivatives are consistent with the physical reality of the process.

Optimum, on the other hand, is represented by driving the process toward an arbitrary set of furnace outlet setpoints, without overfiring the furnaces (i.e., overstressing the reactors.)

According to my invention, system 30 in effect computes and establishes a change in the ith furnace outlet temperature $T_i$ in accordance with algorithms having the following form:

$$\Delta T_i = -k_1 \left\{ \left( \frac{\partial O}{\partial T_i} \right) e_O + \left( \frac{\partial O_j}{\partial T_i} \right) e_{\theta j} \right\} + k_2 \left( \frac{\partial J}{\partial T_i} \right)$$

where $\Delta T_i$ = change required in outlet temperature of the ith furnace.

O = octane number, or equivalent.

$e_O$ = difference between actual O and desired value therefore.

$\theta_j$ = stress in the i'th furnace (usually, but not necessarily, watched over by monitoring tube skin temperature $T_j$)

$k_1, k_2$ = weighting constants, where $k_1$, is much greater than $k_2$.

$e_{\theta j}$ = a measure of the relation between actual furnace stress and maximum permissible value thereof.

J = an "objective" function of arbitrary form, which defines an optimization criterion.

The indicated partial differentiation has the usual significance, that is to say, it expresses the effect, on octane, say, as if of change in $T_i$ alone, and so on.

Figure 2:
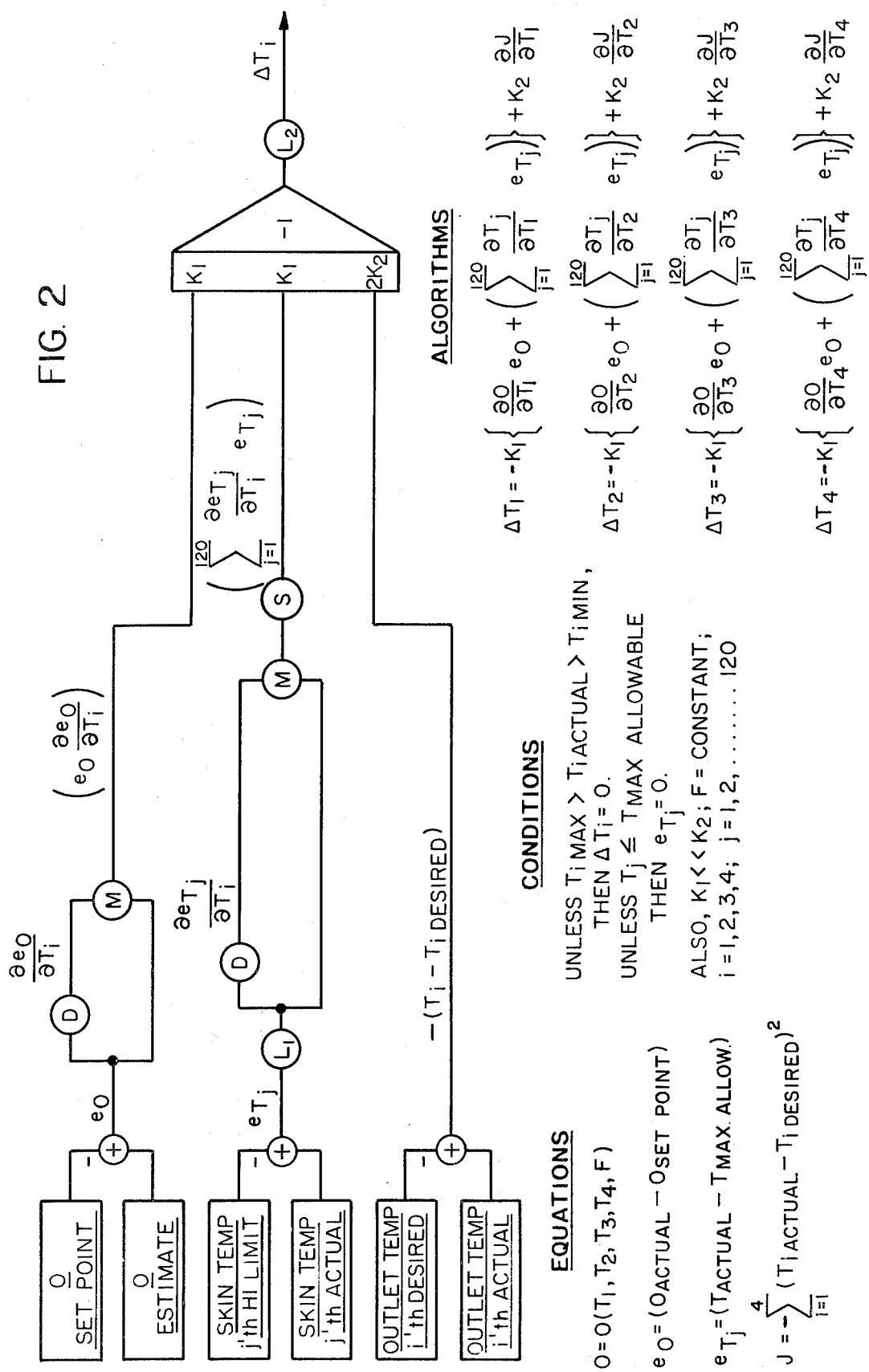
FIG. 2 is a partly-diagrammatic representation of the physico-mathematical principles of my invention.

In FIG. 1, i=4, and in FIG. 2, I have shown the diagrammatic working out of algorithm (1), supra, in terms of FIG. 1, and as well, of the several equations, conditions, and specific algorithms appropriate for control of the FIG. 1 reformer.

In view of algorithm (1), supra, and the explanations appended thereto, FIG. 2 is essentially self-explanatory.

Insofar as EQUATIONS are concerned, I am considering octane to be a function of feedstock flow and furnace outlet temperatures only. That such assumption is reliable is proven by the fact that a operator can establish a condition of feedstock flow and hydrogen recycling, and thereafter can control outlet temperatures such as to approximate a desired octane rating. As for J, it is defined in terms of the square of the differences between actual furnace outlet temperature and desired furnace outlet temperature, wherein the latter is some arbitrary value which is beyond the capacity of human control of $T_i$, or otherwise infeasible in some sense, but nevertheless a viable objective in that modestly pursuing it will result in some functional and/or economic benefit.

Under CONDITIONS, the first is obviously a requirement that the process be underway, whereas the second says that $T_j$ shall have no effect unless some bound on it is exceeded. The bound here is maximum allowable skin temperature and a particular number j(120) of sites is contemplated, that is to say, each furnace has thirty thermocouples or the like distributed two per pass or tube thereover, any one of which may indicate that the furnace has reached a stress limit at that place.

As for ALGORITHMS, it is evident that unless the quantity between the braces is very small, the contribution of a partial derivative of J generally will have little influence on the $\Delta T_i$'s. We also see that any skin temperature constraint influences each of the algorithms. If this is not the case, the appropriate partial derivative is null. In actual fact, a change in the outlet temperature of a furnace will have an effect on the tube skin temperatures of the next furnace in the series as the controller attempts to maintain its outlet temperature at its setpoint. In any event, all ALGORITHMS act concurrently.

As for the diagrammatic, i.e., the flow chart part of FIG. 2, from the left summing junctions (marked "+"), produce $e_O$, $e_{Tj}$, and $-2(T_i - T_i$ desired), this last being the partial derivative of J as defined in EQUATIONS.

The logic block L1 symbolizes the implementation of the conditions on $T_j$. The block D symbolizes the partial differentiation of $T_j$, the block M symbolizes the multiplication of the partial derivative by ET, and S symbolizes summation of the product. At the top of the diagram, blocks D and M play corresponding roles for O.

At the right of the diagram occur multiplications by $k_1$ and $k_2$, and by minus 1, to produce $-T_i$, after the logic block L2 has applied the first of CONDITIONS, and the net result is an evaluation of one of ALGORITHMS. In practice, the computing scheme amounts to nothing but simple arithmetic because it is assumed that only first degree variables (except J) and empirical data obtained from experience or by measurement are involved.

While the algorithms disclosed herein have been presented pretty much as if purely the product of intuition and experience, in reality there is an underlying background of control theory for the type of control represented by the algorithms, such background being set forth in my paper "A Simple Multivariable Control Algorithm With Applications to Gasoline Blending and Ammonia Reform Furnaces", 1975 Summer Computer Simulation Conference Proceedings, AFIPS Press, 210 Summit Avenue, Montvale, New Jersey 07645, which paper is to be taken as incorporated by reference in this disclosure.

The present invention is a confirmation of the theory suggested by the paper, in that the present algorithms have been determined by actual experience to work out as proposed in the paper, e.g., under "*Gain Distribution—A Control Philosophy*" (at the beginning of the paper) and "*Summary*" (at the end of the paper), which epitomize the theoretical findings of the paper.

In implementing my invention, a POLSTAR 1 control system (which includes a small general purpose commercially available digital computer) made by the Taylor Instrument Company Division of the Sybron Corporation was supplied with software for taking over control of a four stage reformer, in accordance with control expedients and approaches previously developed by the proprietor of the reformer. In addition, the software package also was provided with the capabilities of my invention, as claimed herein. This addition, among other things, provides the reformer control system with continual automatic manipulation of all furnaces to maintain octane while driving the reactors at their limits and maximizing throughput, in a manner beyond the capabilities of a human operator.

While I believe it is true to say that algorithms that work are rare, some modifications of my algorithms are possible. For instance, gasoline is sold by volume, so one might well choose specific volume of the product to control or optimize. In fact, aniline point rather than octane is being used in practice. (A periodic sampling of aniline point which is entered into an octane estimation computer 46, and updated from measurements of furnace outlet temperature and reactor outlet temperature, is actually used to provide continuous measurement of actual octane). Other possibilities are Reid Vapor Pressure, extent of conversion to particular hydrocarbons (e.g., benzene, toluene, xylene) commonly referred to as severity.

Other CONDITIONS can provide constraints on the process: furnace stack temperature, gas flow, header pressure, temperature change between furnace outlet and outlet to name a few.

The feed flow per se could be taken for optimization. This would be equivalent to setting to zero all the partials of J with respect to $T_i$ in the FIG. 2 algorithms, and defining J such that its first derivative with respect to flow would be equal to 1, and adding a fifth ALGORITHM for $\Delta F$ of identical form as the fourth algorithm for $\Delta T_4$ except that F would replace $T_4$ everywhere in the right hand side of the equation.

Having described my invention as required by the statutes, I claim:

1. In a reforming process having furnace and reactor pairs connected in series, furnace outlet to reactor inlet, for passing feedstock through said reactors for ultimately producing therefrom stabilized product having a desired octane rating O;

said process also having an improved control system comprising temperature regulating means for causing said furnaces to heat said feedstock to predetermined furnace outlet temperatures, each said furnace being individually controllable to establish the corresponding furnace outlet temperature $T_i$, said temperature regulating means being adjustable to change the value of $T_i$ for any furnace;

and said control system also having furnace stress sensing means for producing stress signals which are measures of stress for each furnace, temperature sensing means for producing outlet temperature signals which are measures of $T_i$ for each furnace, and product evaluating means for producing a product signal which is a measure of O for said product;

said control system comprising computer means responsive to said stress signals, outlet temperature signals and product signals, for computing adjusting signals for adjusting said temperature regulating means such as to change the value of $T_i$ for said furnace outlet temperatures, and said control system having means applying said adjusting signals to said temperature regulating means for making adjustments thereof such as to cause said furnace outlet temperatures to change by amounts $\Delta T_i$, wherein:

$$\Delta T_i = -k_1 \left\{ \frac{\partial O}{\partial T_i} e_o + \frac{\partial \theta_j}{\partial T_i} e_{\theta j} \right\} + k_2 \frac{\partial J}{\partial T_i}$$

$\Delta T_i$ = change required in outlet temperature $T_i$ of the i'th furnace,
O = octane number, or equivalent,
o = difference between actual O and desired value therefore,
$\theta_j$ = stress in the i'th furnace,
J = an "objective" function of arbitrary form, which defines an optimization criterion,
$k_1$, $k_2$ = weighting constants, where $k_1$, is much greater than $k_2$, and
$e_{\theta j}$ = a measure of the relation between actual furnace stress and maximum permissible value thereof.

2. The invention of claim 1, wherein $$\partial J/\partial T_i = -2(T_i - T_{i\ desired}).$$

3. The invention of claim 1, wherein $$\partial J/\partial T_i = 0,$$

$$\partial J/\partial F = 1$$

and said control system includes an additional algorithm as means for changing the rate of supply of said feedstock to said reactors.

4. The invention of claim 1, wherein said computer means takes $e_i$ as zero for every furnace whose stress does not exceed a predetermined limit.

5. The invention of claim 1 wherein stress is sensed as furnace tube skin temperature.

6. The invention of claim 5, wherein $$\partial \theta_j/\partial T_i = \partial T_j/\partial T_i$$

j = 1, 2 . . . b, and b is the number of places on the furnace tube skins at which skin temperature is measured.

7. The invention of claim 6 wherein said computer means takes $e_i$ as zero for any furnace having no skin temperatures exceeding a maximum allowable value.

8. The invention of claim 1 wherein $k_2$ is small enough compared to $k_1$ that $\partial J/\partial T_i$ generally does not appreciably effect $\Delta T_i$ unless $e_O$ and every $e_{Tj}$ are all zero, in which case the control system increases J whereby both to optimize J to the extent permitted by maximum allowable stress values.

9. The invention of claim 8, wherein said computer means takes $e_i$ as zero for every furnace whose stress does not exceed a predetermined limit.

10. The invention of claim 9, wherein stress is sensed as furnace tube skin temperature.

11. A control method for a process wherein material is passed through process equipment and subjected to an effect causing said material to exhibit a change in a measurable property thereof, said process equipment being subject to stress due to said effect and there being a desired and an actual measured value of said property, said method comprising the steps of:

(1) causing a first variation of said effect to have a sense such as to decrease difference between said desired value and said measured value;

(2) causing a second variation of said effect to have a sense such as to change said property in accordance with a predetermined optimization criterion;

(3) causing said second variation to occur regardless of whether there is a said first variation, said first variation being large compared to said second variation;

(4) and causing said effect to change such as to decrease said stress whenever the stress on a portion of said process equipment surpasses a tolerable limit;

and wherein, calling said effect T, said variations correspond to a net change in T, of $$\Delta T = -k_1 \frac{\partial e_0}{\partial T} e_0 + k_2 \frac{\partial J}{\partial T},$$

where
$\Delta T$ = Change in effect T called for by said first second variations,
$e_O$ = Difference between measured value and desired value of said property,
J = A function defining said criterion
O = Said property, and
$k_1$, $k_2$ = Weighting constants;
except when stress limited, in which case $\Delta T$ will also be in accordance with $$-k_1 \frac{\partial e_S}{\partial T} e_S,$$

whenever said stress surpasses said limit; where
S = a measure of said stress, and
$e_S$ = measure of difference between tolerable and actual values of said stress.

12. In a reforming process having furnace and reactor pairs connected in series, furnace outlet to reactor inlet, for passing feedstock through said reactors for ultimately producing therefrom stabilized product having a desired octane rating O;

said process having an improved control system comprising temperature regulating means for causing said furnaces to heat said feedstock to predetermined furnace outlet temperatures, each said furnace being individually controllable to establish the corresponding furnace outlet temperature $T_i$, said temperature regulating means being adjustable to change the value of $T_i$ for any furnace;

said control system also having furnace stress sensing means for producing stress signals which are measures of stress for each furnace, temperature sensing means for producing outlet temperature signals which are measures of $T_i$ for each furnace, and product evaluating means for producing a product signal which is a measure of O for said product;

and said control system also comprising computer means responsive to said stress signals, outlet temperature signals and product signals, said computer means developing a first signal proportional to the ratio between change in O and change in outlet temperature, a second signal proportional to the deviation of actual O value from a desired O value, and a third signal proportional to the product of said first and second signals;

said computer means developing a fourth signal proportional to the ratio of skin stress change to outlet temperature change, a fifth signal representative of the excess of said skin stress over an allowable limit of said skin stress, a sixth signal proportional to the product of said fourth and fifth signals, and a seventh signal proportional to the summation of said sixth signal over said skin;

said computer means developing an eighth signal proportional to the ratio between change in an objective function defining an optimization criterion and change in said outlet temperature;

said computer means developing a ninth signal proportional to the difference between said eighth signal and the sum of said third and seventh signals, said computing means developing said ninth signal such that the contribution of said sum thereto is large in magnitude compared to said eigth signal;

said computer means developing a said ninth signal in respect of each said furnace and reactor pair, and, in so doing, utilizing measures of outlet temperature and skin stress thereof, for producing as many versions of said ninth signal as there are said furnace and reactor pairs;

said control system including means applying said versions of said ninth signal to said temperature regulating means for making adjustments thereof such as to cause each furnace outlet temperature to change in accordance with the corresponding said one of said versions of said ninth signal.

* * * * *